United States Patent
Griffin

(10) Patent No.: US 7,962,099 B2
(45) Date of Patent: Jun. 14, 2011

(54) SYSTEM AND METHOD FOR REDUCING RADIO FREQUENCY INTERFERENCE BETWEEN A WIRELESS COMMUNICATION DEVICE AND A SPEAKER

(75) Inventor: Jason Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1580 days.

(21) Appl. No.: 11/296,263

(22) Filed: Dec. 8, 2005

(65) Prior Publication Data

US 2007/0133818 A1 Jun. 14, 2007

(51) Int. Cl.
*H04B 1/00* (2006.01)
*H04B 15/00* (2006.01)
(52) U.S. Cl. .................... 455/63.1; 381/94.1
(58) Field of Classification Search .......... 381/94.1, 381/91, 57, 122, 94.7–94.9; 455/522, 63.1
See application file for complete search history.

(56) References Cited

U.S. PATENT DOCUMENTS

| | | | |
|---|---|---|---|
| 5,917,812 A | 6/1999 | Antonio et al. | |
| 6,122,500 A | 9/2000 | Dent et al. | |
| 6,363,344 B1 * | 3/2002 | Higuchi | 704/226 |
| 6,445,916 B1 * | 9/2002 | Rahman | 455/423 |
| 6,996,416 B2 * | 2/2006 | Ito | 455/556.1 |
| 7,266,378 B2 * | 9/2007 | Norta et al. | 455/456.1 |
| 2006/0239480 A1 * | 10/2006 | Zhu et al. | 381/306 |

OTHER PUBLICATIONS

Patent Abstrats of Japan vol. 2003, No. 12 (Dec. 5, 2003) & JP 2005 260535 (Matsushita Electric IND CO LTD); Sep. 22, 2005 *Abstract*.
Search Report and Written Opinion issued in connection with the corresponding European Patent Application No. EP05111860.2.

* cited by examiner

*Primary Examiner* — Vivian Chin
*Assistant Examiner* — Con P Tran
(74) *Attorney, Agent, or Firm* — Gowling Lafleur Henderson LLP

(57) ABSTRACT

A device and method are provided that reduce interference between a wireless communication device and a speaker. Generally speaking, a microphone input is monitored for detecting noise created by the interference. If noise is detected, a power transmission level of the wireless device is reduced from a standard power transmission level.

21 Claims, 3 Drawing Sheets

SYSTEM AND METHOD FOR REDUCING RADIO FREQUENCY INTERFERENCE BETWEEN A WIRELESS COMMUNICATION DEVICE AND A SPEAKER

FIELD OF THE INVENTION

The invention relates generally to the transmission of data to and from a wireless communication device and specifically for a system and method for reducing interference between the wireless device and a proximate speaker while doing so.

BACKGROUND OF THE INVENTION

The advance of wireless communication networks has led to the proliferation of wireless communication devices that are used for the transfer of both voice and data. Personal Digital Assistants (PDAs) and smart-phones provide users with a device that enables them to communicate via voice communications, electronic mail (e-mail), Short Message Service (SMS) messages as well as instant messaging. Additionally, many of these devices also include web browsers and other applications that access a wide area network, such as the Internet, to provide the users with information.

However, when these devices transmit data they can cause noise to be heard on nearby speakers, such as radio speakers, computer speakers, speakerphones, and the like as a result of interference there between. Accordingly, it can be seen that there is a need for a system and method that inhibits interference between a wireless device and a nearby speaker.

BRIEF DESCRIPTION OF THE DRAWINGS

Embodiments of the invention will now be described by way of example only with reference to the following drawings in which.

DETAILED DESCRIPTION OF THE PREFERRED EMBODIMENTS

In accordance with an aspect of the present invention there is provided a method for reducing interference between a wireless communication device and a speaker, the method comprising the steps of: monitoring a microphone input for detecting noise created by the interference; and reducing a power transmission level of the wireless device from a standard power transmission level.

In accordance with a further aspect of the present invention, the method further includes the steps of initiating a predefined event; monitoring the predefined event to determine when a predefined event threshold is reached; and returning the power transmission level of the wireless device to the standard power transmission level when said predefined event threshold is reached.

In accordance with yet a further aspect of the present invention there is provided a wireless communication device configured to reduce interference with a speaker, the wireless communication device comprising: a noise detection unit configured to detect noise caused by the interference; and a power controller configured to reduce a power transmission level of the wireless device in response to the detection of noise by the noise detection unit.

In accordance with yet a further aspect of the present invention, the device includes an event unit configured to trigger an event in response to the detection of noise by the noise detection unit; and an event monitor configured to detect when the triggered event reaches a predefined event threshold and instruct the power controller to return the power transmission level of the wireless device to the standard power transmission level.

In accordance with yet a further aspect of the present invention there is provided a data storage device comprising instructions which, when executed on a wireless device, cause the wireless device to facilitate reduced interference with a speaker by implementing the steps of: monitoring a microphone input for detecting noise created by the interference; and reducing a power transmission level of the wireless device from a standard power transmission level.

Figure 1:
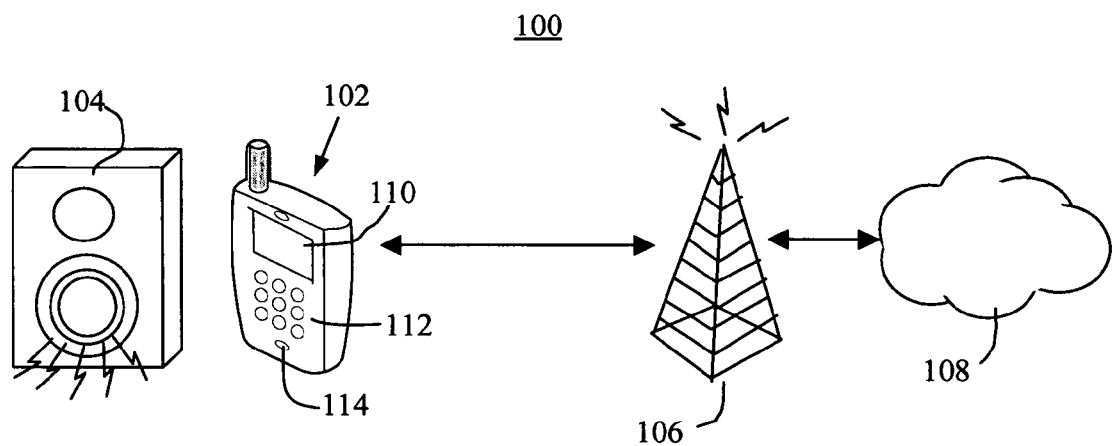
FIG. 1 is a block diagram illustrating a situation with the potential for interference between a proximate wireless device and a speaker (prior art)

For convenience, like numerals in the description refer to like structures in the drawings. Referring to FIG. 1, a sample environment in which interference exists between a wireless device and a speaker is illustrated generally by numeral 100. In the present example, a wireless device 102 is within close proximity of a speaker 104, such as a speakerphone for example. Further, the wireless device 102 is in communication with a communication network 108 via a transmission tower 106.

The wireless device 102 includes a display 110 for presenting information to the user and an input device 112, such as a touch screen, keypad, miniature keyboard, scroll bar or any combination thereof, for allowing the user to input data. The wireless device 102 further includes a microphone 114 for facilitating voice communication or voice commands and well as a built in speaker for facilitating audio output. These features are common in the art variations will be apparent to a person of ordinary skill in the art.

When the wireless device 102 transmits data to the communication network 108 via the transmission tower 106, noise is often emitted from the speaker 104. The volume of the noise and the duration for which it lasts depends on a number of factors including radio frequency (RF) shielding of the speaker 104, the distance between the speaker 104 and the wireless device 102, and the strength of the signal emitted by the wireless device 102.

Figure 2:
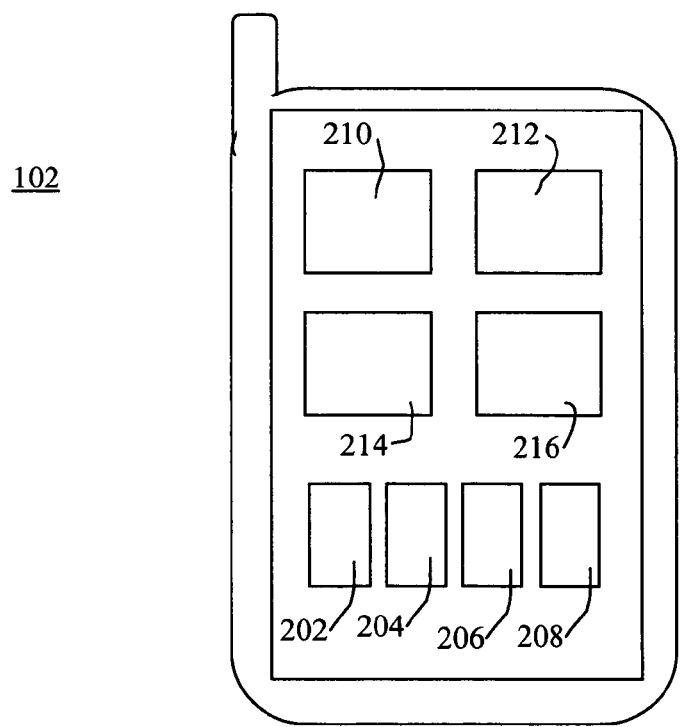
FIG. 2 is block diagram of a wireless device.

Referring to FIG. 2, a more detailed view of the wireless device 102 is illustrated. The wireless device 102 includes state of the components such as memory 202, a processor 204, a communication interface 206 and an input/output interface 208. A person of ordinary skill in the art will appreciate that different devices are configured in accordance with the required specification and are not limited to the components described herein.

As described with reference to FIG. 1, noise may be a problem due to interference between the wireless device 102 and the speaker 104. Therefore, the wireless device 102 further includes a noise detection unit 210 configured to detect noise created by interference with the speaker 104. Specifically, the noise detection unit 210 is configured to use the microphone 114 to listen for noise. If noise is detected, a standard transmission power level used to transmit data from the handheld device 102 to the transmission tower 106 is reduced to a low transmission power level.

The wireless device 102 further includes an event unit 212 configured to implement a predefined event upon detection of noise by the noise detection unit 210. Further, an event monitor 214 is configured to return the transmission power level from the low transmission power level to the standard transmission power level in accordance with a predefined event threshold. A power level controller 216 is configured to adjust the power transmission level of the device as desired. Each of the noise detection unit 210, event unit 212, event monitor 214 and power level controller 216 can be implemented in hardware or software, or a combination thereof.

Figure 3:
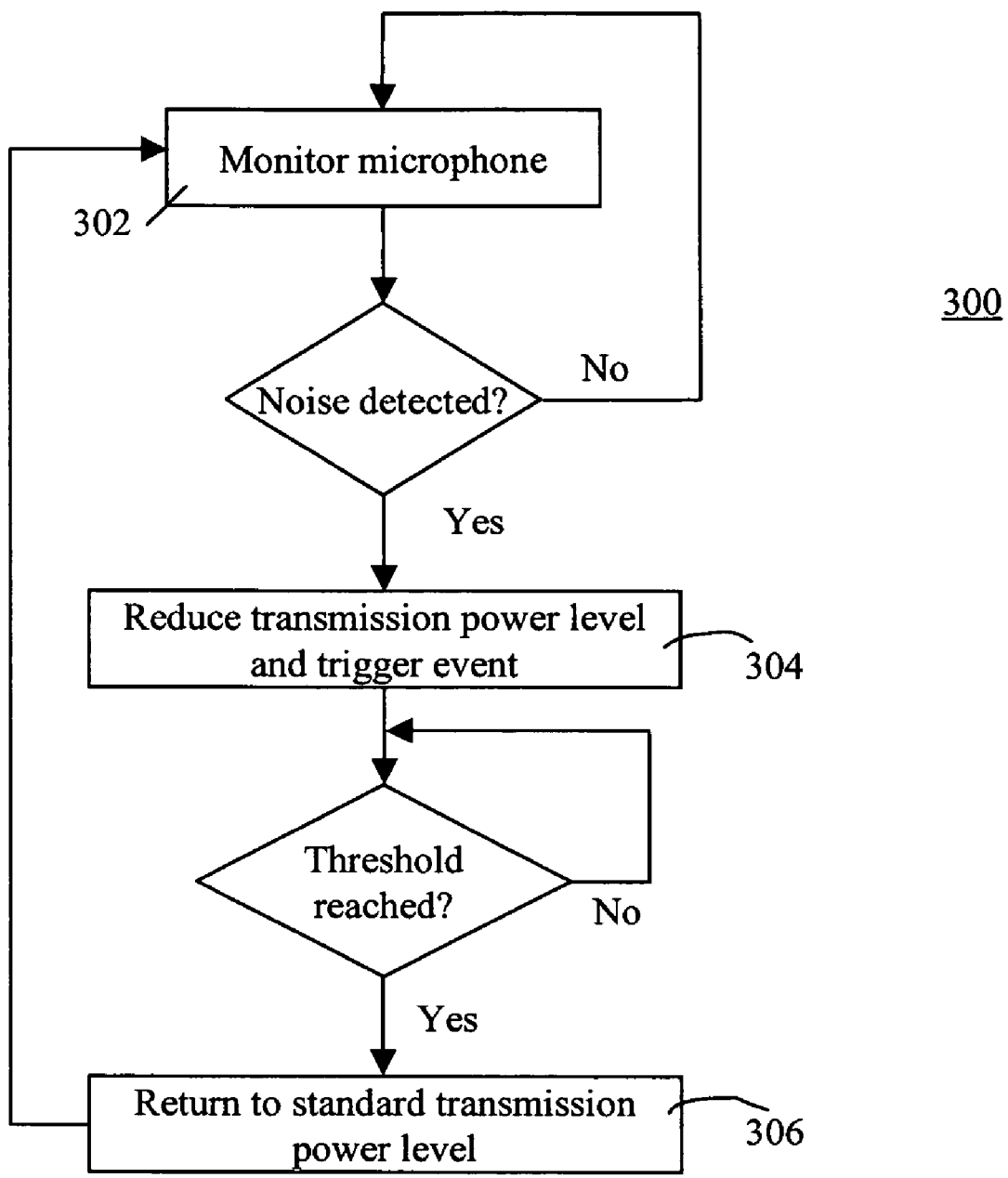
FIG. 3 is flow chart illustrating the operation of an embodiment of the invention.

Referring to FIG. 3, a flow chart illustrating operation of the present embodiment is represented generally by numeral 300.

In step 302 the noise detection unit 210 monitors the microphone 114 for noise caused by interference between the speaker 104 and the wireless device 102. Noise detection can be achieved using any one of a number of standard noise detection algorithms that is configured to identify the noise due to speaker interference. It will be appreciated by a person of ordinary skill in the art that different parameters of the noise detection algorithm may be configured differently depending on the implementation.

In the present embodiment, the noise detection unit 210 only monitors the microphone 114 when RF communication is occurring. It will be appreciated that in alternate embodiments, for example, the noise detection unit 210 can monitor the microphone 114 at all times, or only when the device 102 is receiving or transmitting data. If noise is detected, the operation continues at step 304, otherwise it remains at step 302.

In step 304, the standard transmission power level used to transmit data from the wireless device 104 to the transmission tower 106 is reduced to the low transmission power level for data transmission. The low transmission power level is configured to limit the interference with the speaker 104, and thereby limit the noise emitted there from.

Further, at step 304 an event is triggered and the event unit 212 is initiated. In the present embodiment, the event unit 212 is a timer. Depending on the implementation, the timer can be designed to count up or down. The operation then proceeds to step 306.

In step 306, the event monitor 214 returns the transmission power level to the standard transmission power level in accordance with the predefined event threshold. For example, in the present embodiment, the event monitor 214 monitors the timer until a predefined time has elapsed before returning the transmission power level to the standard transmission power level.

Accordingly, it will be apparent that for the duration in which the low power transmission level is applied, interference between the wireless device 102 and the speaker 104 is reduced. However, the reduction in transmission power may cause more transmission errors, which causes data retransmissions, or retries. Often the number of retries is sufficiently low that it is considered to be a worthwhile trade-off for the reduced interference. However, in some instances retries may be less desirable than others.

Figure 4:
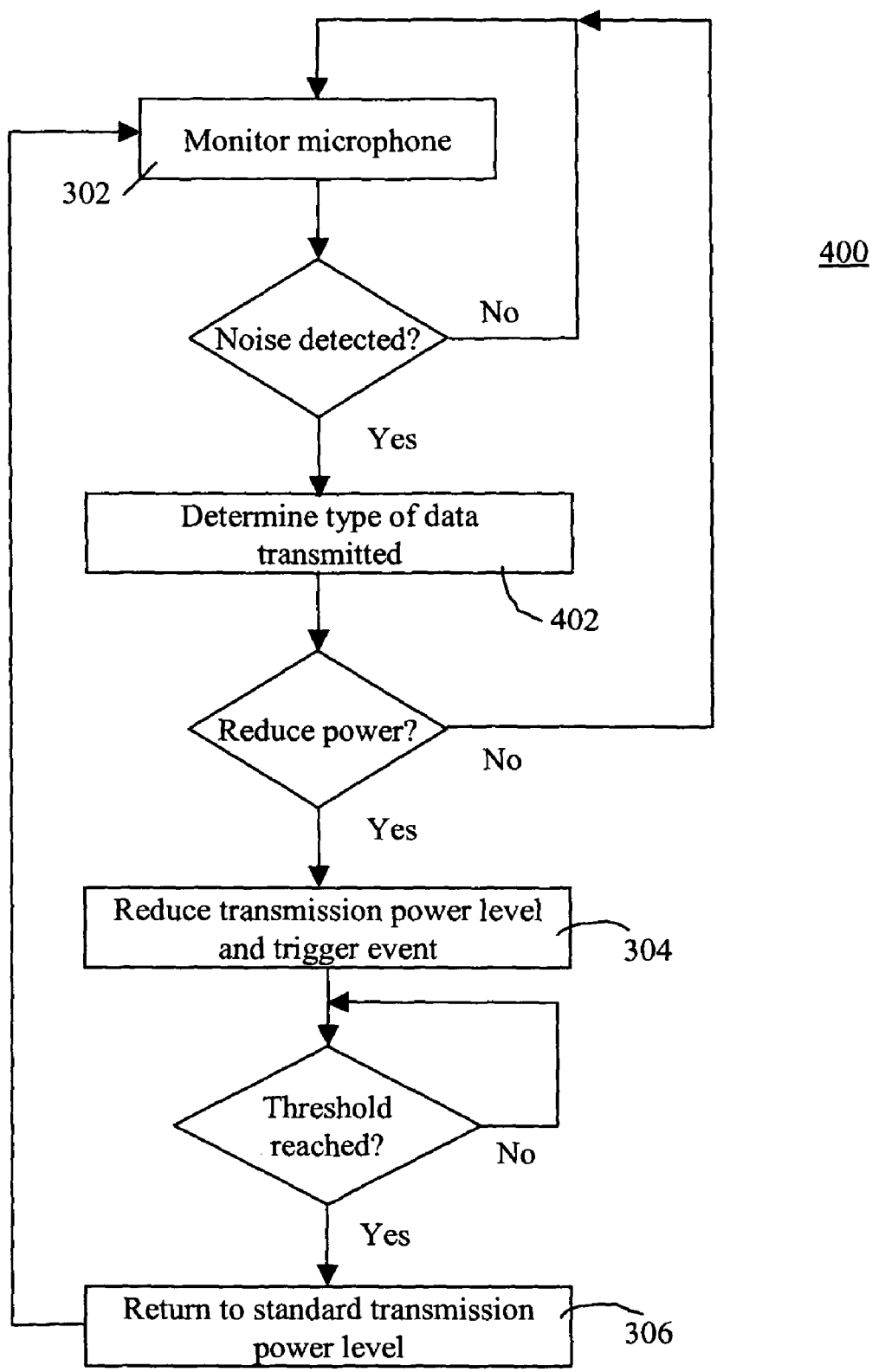
FIG. 4 is a flow chart illustrating the operation of an alternate embodiment of the invention.

Referring to FIG. 4, a flow chart illustrating an alternate embodiment of the present invention is illustrated generally by numeral 400. In the present embodiment, the wireless device determines the type of data being transmitted in order to minimize the number of retries in certain circumstances. Specifically, an additional step 402 is added between steps 302 and 304, described with reference to FIG. 3.

In step 402, a data determination unit determines the type of data being transmitted from the wireless device 102 to the transmission tower 106. Although not shown in FIG. 2, it will be appreciated that the data determination unit can be implemented on the device in hardware, software or a combination thereof.

If, for example, the data determination unit detects that the wireless device 102 is transmitting such as acknowledgements for incoming data then the potential increase in retries is a good compromise for the reduced interference and the operation continues at step 304. Other candidates for an acceptable increase in the number of retries include polling for e-mail or other data in a pull data environment.

Alternately, however, if the data determination unit determines that the type of data being transmitted from the wireless device 102 to the transmission tower 106 should use minimal retries, then the detection of interference is ignored, the transmission power level remains the same and the operation returns to step 302. Data that requires minimal transfers may include voice communication and e-mails or other data transfers initiated by the user. Further, applications may be assigned a Quality of Service (QoS) indicator to assist making the decision whether or not the power level can be reduced. Applications assigned a high QoS indicator would require a higher power level and applications assigned a low QoS indicator could tolerate a lower power level.

Optionally, the return to step 302 from step 402 is delayed in time to limit looping that may occur between steps 302 and 402. That is, if the operation returns immediately to step 302, the interference would once again be detected and the operation would return to step 402. At step 402, it would be determined that the power transmission level should not be reduced and the operation would return once again to step 302. This loop would continue until either one of the conditions changes, while using resources on the wireless device 102. Accordingly, if step 402 includes a delay before returning to step 302, the probability that one of the conditions has changed is increased, thereby reducing the use of the wireless device's resources.

The embodiments described above either transmit at a standard power transmission level or a low power transmission level. In an alternate embodiment, for some data it may be possible simply not to transmit anything to the communication network 108. Therefore, rather than transmit at a low power transmission level, the wireless device 102 simply does not acknowledge the data at all so the communication network 108 retransmits the data to the wireless device 102 at a later point in time.

Further, in the embodiments described above, the event unit 212 is implemented as a timer. However, since the interference between wireless device 102 and the speaker 104 is related largely to their proximity, the event unit 212 may comprise a geospatial device such as accelerometer, global positioning system (GPS), motion sensors and the like. Optionally, the event unit 212 includes both the geospatial device and the timer in case the speaker 104 is in motion and the wireless device is stationary.

Therefore, at step 304, when the event is triggered and the event unit 212 is initiated, the geospatial device provides information relating to the position of the wireless device 102. For example, the GPS could provide the coordinates of the wireless device 102, while the accelerometer and motion sensor could determine motion.

At step 306, the event monitor 214 monitors the position of the wireless device 102 as determined by the geospatial device to determine a distance of which the wireless device 102 has moved. Once the device has moved further than a predefined distance threshold, the transmission power level is returned to the standard transmission power level and the operation returns to step 302. If the event unit 212 also includes the timer, the transmission power level is returned to the standard transmission power level and the operation returns to step 302 after a predefined time threshold has elapsed, even if the wireless device 102 does not move further than the predefined distance threshold.

The predefined distance threshold may be static and commonly defined for all circumstances. Alternately, the predefined distance threshold is dynamic and assigned in accordance with the volume of the detected noise. A greater volume of noise typically, although not necessarily, indicates greater interference between the wireless device 102 and the speaker 104. Accordingly, the greater the volume of detected noise, the larger the predefined distance threshold.

Similarly, the low transmission power level described above may either be static or dynamic. That is, one value may be used for the low transmission power level for all circumstances or a different value may be used for the low transmission power level depending upon the volume of the detected noise. As previously described, a greater volume of noise typically indicates greater interference between the wireless device 102 and the speaker 104. Accordingly, the greater the volume of detected noise, the lower the value selected for the low transmission power level.

Optionally, in the present embodiment the signal strength of the wireless device 102 is an additional factor used to determine the value for transmission power level. A strong signal strength would allow a relatively low transmission power level, whereas a weak signal strength would require a relatively high transmission power level.

Although the subject application refers specifically to the use of transmission towers 106 as an interface between the wireless device 102 and the communication network 108, any wireless communication interface may be used.

Further, although preferred embodiments of the invention have been described herein, it will be understood by those skilled in the art that variations may be made thereto without departing from the spirit of the invention or the scope of the appended claims.

What is claimed is:

1. A method for reducing an interference between a wireless communication device, the wireless communication device having a first speaker, and a second speaker in a proximity of the wireless communication device, the method comprising monitoring a microphone input of the wireless communication device for detecting a noise from the second speaker, the noise caused by the interference between the wireless communication device and the second speaker; and reducing a power transmission level of the wireless communication device from a standard power transmission level in response to a detection of the noise.

2. The method of claim 1, further comprising:
initiating a predefined event;
monitoring the predefined event to determine when a predefined event threshold is reached; and
returning the power transmission level of the wireless communication device to the standard power transmission level when said predefined event threshold is reached.

3. The method of claim 2, wherein the power transmission level is reduced to a lower power transmission level.

4. The method of claim 2, wherein the power transmission level is reduced by not transmitting data from the wireless communication device.

5. The method of claim 2, wherein the initiating the predefined event comprises starting a timer and the predefined event threshold is a predefined duration of time.

6. The method of claim 2, wherein the initiating the predefined event comprises determining a geospatial position of the wireless communication device and the predefined event threshold is a predefined distance traveled.

7. The method of claim 6, wherein the geospatial position and predefined distance traveled are determined using at least one of an accelerometer, global positioning system and a motion sensor.

8. The method of claim 6, wherein the initiating the predefined event further comprises starting a timer and the predefined event threshold further includes a predefined duration of time.

9. The method of claim 1, further comprising: determining that data retransmissions are acceptable before reducing the power transmission level.

10. The method of claim 3, wherein the determining that data retransmissions are acceptable comprises interpreting a Quality of Service indicator.

11. A wireless communication device, the wireless communication device having a first speaker, configured to reduce interference with a second speaker, the wireless communication device comprising:
a microphone;
a noise detection unit monitoring the microphone to detect a noise from the second speaker in a proximity of the wireless communication device, the noise caused by an interference between the wireless communication device and the second speaker; and
a power controller configured to reduce a power transmission level of the wireless communication device in response to a detection of the noise by the noise detection unit.

12. The wireless communication device of claim 11, further comprising:
an event unit configured to trigger an event in response to the detection of the noise by the noise detection unit; and
an event monitor configured to detect when the triggered event reaches a predefined event threshold and instruct the power controller to return the power transmission level of the wireless communication device to a standard power transmission level.

13. The wireless communication device of claim 12, further including a data a determination unit configured to determine if data retransmissions are acceptable before reducing the power transmission level.

14. The wireless communication device of claim 12, wherein the data determination unit determines that data retransmissions are acceptable in accordance with a Quality of Service indicator.

15. The wireless communication device of claim 12, wherein the power controller is configured to reduce the power transmission level to a lower power transmission level.

16. The wireless communication device of claim 12, wherein the power controller is configured to reduce the power transmission level by not transmitting data from the wireless communication device.

17. The wireless communication device of claim 12, wherein the event unit comprises a timer and the predefined event threshold is a predefined duration of time.

18. The wireless communication device of claim 12, wherein the event unit comprises a geospatial positioning device configured to determine a geospatial position of the wireless communication device and the predefined event threshold is a predefined distance traveled.

19. The wireless communication device of claim 18, wherein the geospatial positioning device is at least one of an accelerometer global positioning system and a motion sensor.

20. The wireless communication device of claim 18, wherein the event unit further comprises a timer and the predefined event threshold further includes a predefined duration of time.

21. A non-transitory data storage medium comprising instructions which, when executed on a wireless communication device, the wireless communication device having a first speaker, cause the wireless communication device to facilitate reducing an interference with a second speaker in a proximity of the wireless communication device by implementing:

monitoring a microphone input of the wireless communication device for detecting a noise from the second speaker, the noise caused by the interference between the wireless communication device and the second speaker; and reducing a power transmission level of the wireless communication device from a standard power transmission level in response to a detection of the noise.

\* \* \* \* \*